US011278129B2

(12) United States Patent
Rendinaro

(10) Patent No.: US 11,278,129 B2
(45) Date of Patent: Mar. 22, 2022

(54) CHILD CARRIER FOR LUGGAGE

(71) Applicant: Kid Carry-On, LLC, Morrisonville, NY (US)

(72) Inventor: Nancy Rendinaro, Morrisonville, NY (US)

(*) Notice: Subject to any disclaimer, the term of this patent is extended or adjusted under 35 U.S.C. 154(b) by 204 days.

(21) Appl. No.: 16/754,453

(22) PCT Filed: Oct. 16, 2018

(86) PCT No.: PCT/US2018/056005
§ 371 (c)(1),
(2) Date: Apr. 8, 2020

(87) PCT Pub. No.: WO2019/079244
PCT Pub. Date: Apr. 25, 2019

(65) Prior Publication Data
US 2020/0345155 A1    Nov. 5, 2020

Related U.S. Application Data

(60) Provisional application No. 62/572,594, filed on Oct. 16, 2017.

(51) Int. Cl.
*A47D 13/02* (2006.01)
*A47D 1/10* (2006.01)
(Continued)

(52) U.S. Cl.
CPC ............ *A47D 13/025* (2013.01); *A47D 1/10* (2013.01); *A45C 7/0045* (2013.01);
(Continued)

(58) Field of Classification Search
CPC ...... A47D 13/025; A47D 1/10; A45C 7/0045; A45C 13/262; A45C 2013/267;
(Continued)

(56) References Cited

U.S. PATENT DOCUMENTS 5,988,657 A   11/1999 Henkel
6,241,313 B1   6/2001 Lenz et al.
(Continued)

FOREIGN PATENT DOCUMENTS

CN        201375264 Y    1/2010
WO   WO-2018071955 A1 *  4/2018  ............... A45C 9/00

OTHER PUBLICATIONS

Thomas, "International Search Report and Written Opinion", related to PCT Application No. PCT/US2018/056005, dated Dec. 31, 2018.

*Primary Examiner* — Milton Nelson, Jr.
(74) *Attorney, Agent, or Firm* — Shawn Gordon, Esq.; Dunkiel Saunder Elliott Raubvogel & Hand, PLLC

(57) ABSTRACT

A child seat for luggage is provided that can be quickly and easily attached and removed from standard wheeled suitcases with extendable handles so that a child can be securely seated on the top of the luggage and wheeled around. The child seat includes a rear member, padded seat, side portions, side portion straps, a lap strap, shoulder straps, and a seat strap that attaches to the non-extendable handle. The child seat is light and flexible enough to be conveniently stored when not in use.

1 Claim, 5 Drawing Sheets

(51) Int. Cl.
*A45C 7/00* (2006.01)
*A45C 13/26* (2006.01)
*A45C 13/30* (2006.01)

(52) U.S. Cl.
CPC ...... *A45C 13/262* (2013.01); *A45C 2013/267* (2013.01); *A45C 2013/306* (2013.01)

(58) Field of Classification Search
CPC ...... A45C 2013/306; B60N 2002/2896; B60N 2/26; B60N 2/2812; A47C 15/00
See application file for complete search history.

(56) References Cited

U.S. PATENT DOCUMENTS

| | | | |
|---|---|---|---|
| 6,932,427 | B2 | 8/2005 | Tamura |
| 7,354,049 | B2 * | 4/2008 | Schmidt .................. A45C 9/00 280/33.993 |
| 7,918,502 | B2 * | 4/2011 | Bacon ..................... B60N 2/28 297/217.1 |
| 8,182,030 | B1 | 5/2012 | Britten |
| 9,254,857 | B2 * | 2/2016 | Fiebelkorn ............... A45C 5/14 |
| 10,611,393 | B1 * | 4/2020 | Simon ..................... A45C 5/14 |
| 2004/0021353 | A1 | 2/2004 | Lozano et al. |
| 2004/0066069 | A1 * | 4/2004 | Caldana ................. B62B 5/082 297/250.1 |
| 2009/0289480 | A1 | 11/2009 | Mcfarland et al. |
| 2012/0085609 | A1 * | 4/2012 | Ostrow ................... A45C 5/14 190/18 A |

* cited by examiner

CHILD CARRIER FOR LUGGAGE

RELATED APPLICATION DATA

This application claims the benefit of priority of U.S. Provisional Application No. 62/572,594, filed Oct. 16, 2017, and titled "Child Carrier for Luggage," which is incorporated by reference herein in its entirety.

FIELD OF THE INVENTION

The present invention generally relates to child seats or supports. In particular, the present invention is directed to a seat or support for a child that can be easily attached to and removed from a piece of wheeled luggage.

BACKGROUND

It can be difficult to travel with small children, especially during train or air travel when it is often necessary to carry both luggage and at least one child. Not surprisingly, then, there have been numerous attempts to modify wheeled luggage so that it might also function as a child seat, or, essentially, a combination luggage/stroller. Examples include U.S. Pat. No. 5,988,657 to Henkel, in which the luggage compartments are rearranged to form a seat, and U.S. Pat. No. 6,241,313 to Lenz et al., U.S. Pat. No. 6,932,427 to Tamura, U.S. Pat. No. 8,182,030 to Britten, and U.S. Publication No. 2004/0021353 to Lozano, each of which involves strapping a seat to the side of the wheeled luggage (when the luggage is in the upright position for being wheeled). In addition, U.S. Publication 2004/0066069 discloses a seat positioned on the top of a piece of wheeled luggage in which the seat and attachment mechanism are relatively bulky, not readily removed, and if removed, cumbersome to store.

There is a need for a device that can be easily attached and removed from a wheeled suitcase and that can comfortably and securely support a child on the suitcase.

SUMMARY OF THE DISCLOSURE

In an exemplary embodiment, a child carrier system is provided including a piece of luggage having a top, a front side, and a rear side, the luggage including wheels, a handle on the top, and an extendable handle on the top near the rear side, wherein the extendable handle extends on a shaft, and a support removably attached to the luggage. The support includes a rear member with a back portion, a first side portion, and a second side portion opposite the first side portion, wherein the first side portion includes a first side portion strap attached to the shaft and wherein the second side portion includes a second side portion strap attached to the shaft. A bottom member is attached to the rear member and includes a bottom member strap attached to the handle such that the bottom member rests on the top of the luggage. A lap strap is designed and configured to detachably connect the first side portion and the second side portion such that the lap strap, the back portion, the first side portion, and the second side portion collectively encircle an occupant when the occupant is seated on the bottom member and the lap strap is connected. A plurality of shoulder straps are attached to the rear member and designed and configured to go over shoulders of the occupant while being releasably attached to at least one of the first side portion, the second side portion, the bottom member, and the lap strap.

Additionally or alternatively, the back portion of the support is positioned substantially above the front side and the top of the luggage.

Additionally or alternatively, the shaft includes a first shaft and a second shaft.

Additionally or alternatively, the first side portion strap is attached to the first shaft and the second side portion strap is attached to the second shaft.

Additionally or alternatively, a leash is included that can be attached to the extendable handle.

Additionally or alternatively, the back portion has a first dimension and a second dimension and, when the support is removed from the luggage, the bottom member, the first side portion, and the second side portion fold onto the back portion such that the bottom member, the first side portion, and the second side portion fit substantially within the first dimension and the second dimension.

Additionally or alternatively, the first side portion strap attaches to the second side portion strap when the bottom member is folded onto the rear member.

In another exemplary embodiment, a child support is provided for supporting an occupant when the support is attached to a suitcase, the child, support including a rear member with a front side, the rear member including a first side portion extending from the front side and a second side portion opposite the first side portion extending from the front side. The first side portion includes a first side portion strap designed and configured to attach to a shaft of an extendable handle of a suitcase when the support is attached to the suitcase and the second side portion includes a second side portion strap designed and configured to attach to a second shaft of the extendable handle of the suitcase when the support is attached to the suitcase. A seat member is attached to the rear member and includes a seat member strap designed and configured to secure the seat member to the suitcase when the first side portion strap is attached to the shaft of the extendable handle and the second side portion strap is attached to the second shaft of the extendable handle. A lap strap is designed and configured to detachably connect the first side portion and the second side portion and a plurality of shoulder straps are attached to the rear member and designed and configured to go over shoulders of an occupant while being connected to at least one of the first side portion, the second side portion, the seat member, and the lap strap.

Additionally or alternatively, a wrist strap is included for attaching to the extendable handle of the suitcase.

Additionally or alternatively, the front side has a first dimension and a second dimension and, when the support is not attached to the suitcase, the seat member, the first side portion, and the second side portion fold onto the rear member such that the seat member, the first side portion, and the second side portion fit substantially within the first dimension and the second dimension.

Additionally or alternatively, the first side portion strap attaches to the second side portion strap when the seat member is folded onto the rear member.

In another exemplary embodiment, a child support is provided for attaching to a piece of luggage that has wheels, a top, a handle, and an extendable handle on a shaft, the support including a rear member, a first side member attached to the rear member, the first side member having a first side member strap, a second side member attached to the rear member opposite the first side member, the second side member having a second side member strap, a bottom member attached to the rear member and including a bottom member strap, a lap strap designed and configured to detachably connect the first side member and the second side member, and a plurality of shoulder straps designed and configured to detachably connect the rear member to at least one of the lap strap, the first side member, and the second side member. When the support is attached to the luggage, the first side member strap is attached to the shaft, the second side member strap is attached to the shaft, and the bottom member strap is attached to the handle.

Additionally or alternatively, a leash is included for attaching to the extendable handle.

Additionally or alternatively, the rear member has a first dimension and a second dimension and, when the support is not attached to the luggage, the bottom member, the first side portion, and the second side portion fold onto the rear member such that the bottom member, the first side portion, and the second side portion fit substantially within the first dimension and the second dimension.

Additionally or alternatively, the first side portion strap attaches to the second side portion strap when the bottom member is folded onto the rear member.

In another exemplary embodiment, a method for supporting a child on a piece of luggage is provided that includes removing a child support seat from a pocket of the piece of luggage, the child support seat including a rear member, a bottom member, a first side member attached to the rear member, the first side member having a first side member strap, a second side member attached to the rear member opposite the first side member, the second side member having a second side member strap, a bottom member attached to the rear member and including a bottom member strap, a lap strap, and a plurality of shoulder straps. The child support seat is then attached to the luggage by securing the first side member strap to a shaft of an extension handle of the luggage, securing the second side member strap to the shaft, and securing the bottom member strap to the luggage. An occupant is placed on the child support seat and secured there by securing the lap strap around the occupant and securing the plurality of shoulder straps over the occupant. The child support seat may then be detached from the luggage and placed back in the pocket.

Additionally or alternatively, the step of securing the plurality of shoulder straps over the occupant includes attaching the plurality of shoulder straps to the lap strap.

Additionally or alternatively, a wrist strap is attached to an extendable handle of the luggage.

Additionally or alternatively, the step of placing the child support seat in the pocket includes folding the bottom member, the first side member, and the second side member fold onto the rear member such that the bottom member, the first side member, and the second side member fit substantially on the rear member.

Additionally or alternatively, the step of securing the bottom member strap to the luggage includes securing the bottom member strap to a handle of the luggage.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DESCRIPTION OF THE DISCLOSURE

A child seat or support is provided that can be quickly and easily attached to or removed from a wheeled suitcase, such as carry-on luggage with extendable handles for pulling/pushing the luggage on its wheels. The seat includes a rear portion, two side portions, and a bottom portion and straps that serve to attach the seat to the top of and to the extendable handles of the suitcase, which allows a child to be seated comfortably and securely on top of the suitcase. A child can sit on top of the suitcase while it rests in the upright position, is wheeled through the airport or down the aisle of the airplane, or is wheeled/rocked back and forth as needed. When not being used as a child support, the seat is completely detachable from the suitcase and can be folded compactly for convenient storage, including for example on or in the carry-on wheeled suitcase it is removed from.

Figure 1:
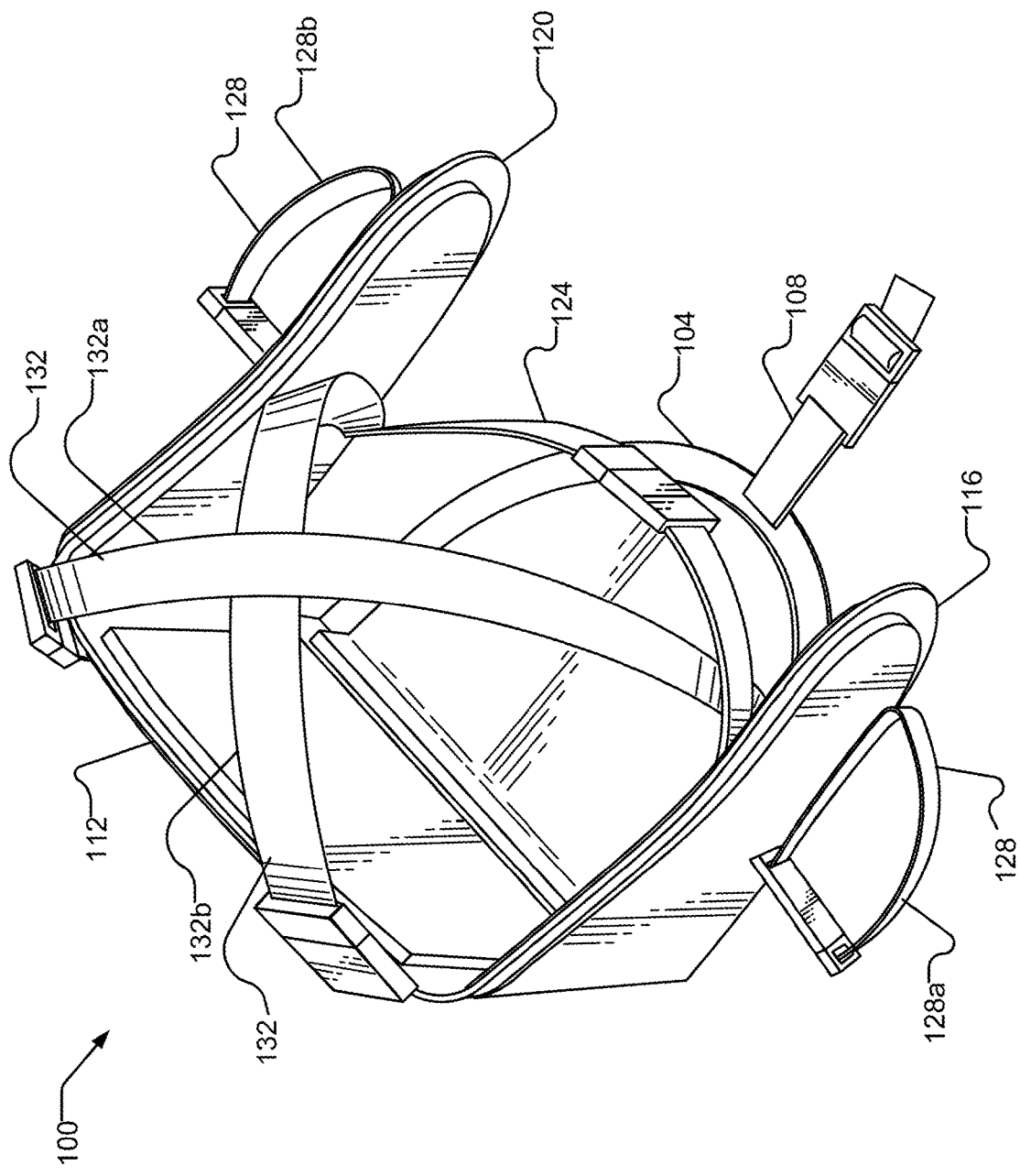
FIG. 1 is a perspective view of a child seat in accordance with an embodiment of the present invention.
Figure 2:
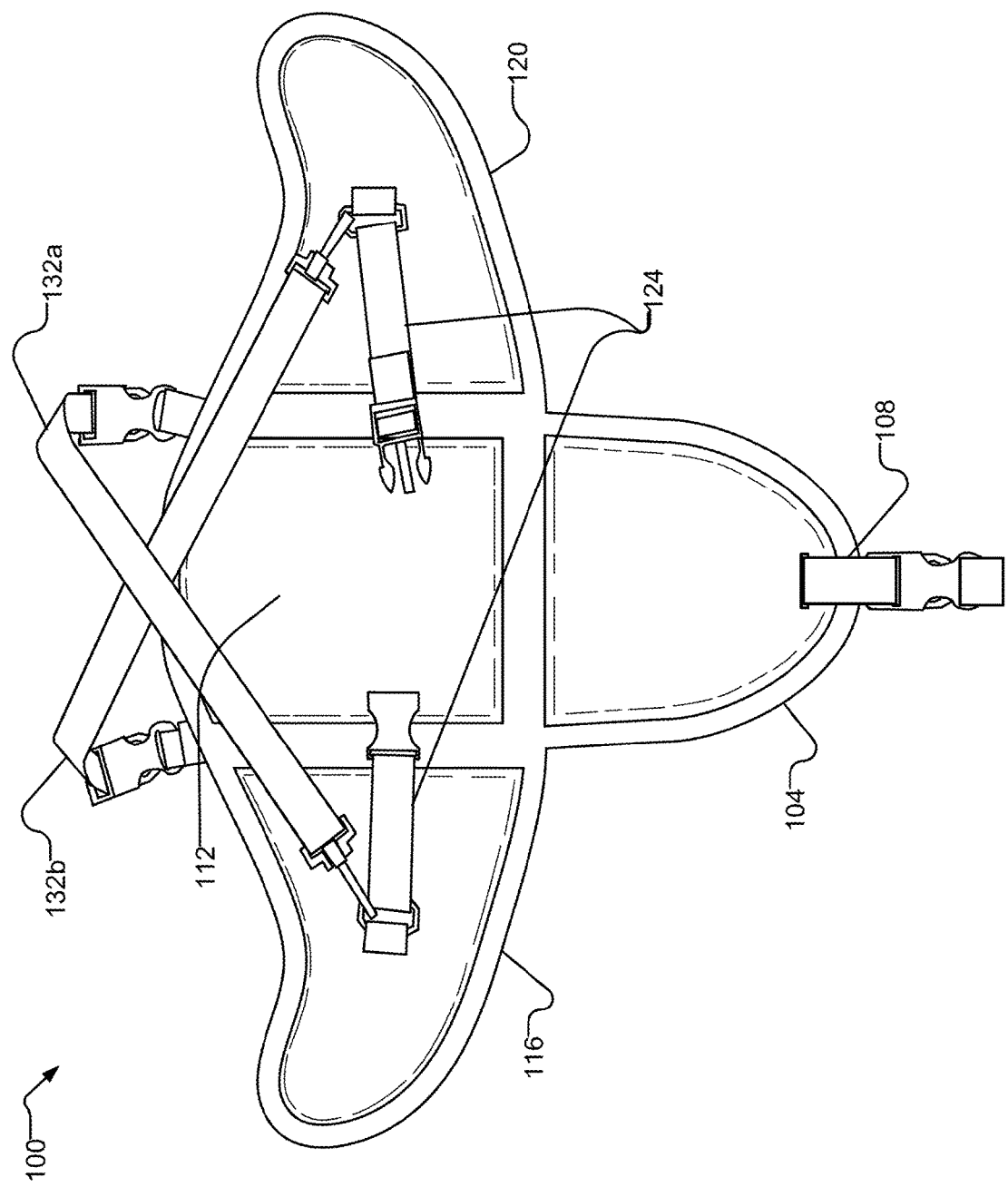
FIG. 2 shows an inside the child seat of FIG. 1 with a lap strap uncoupled.
Figure 3:
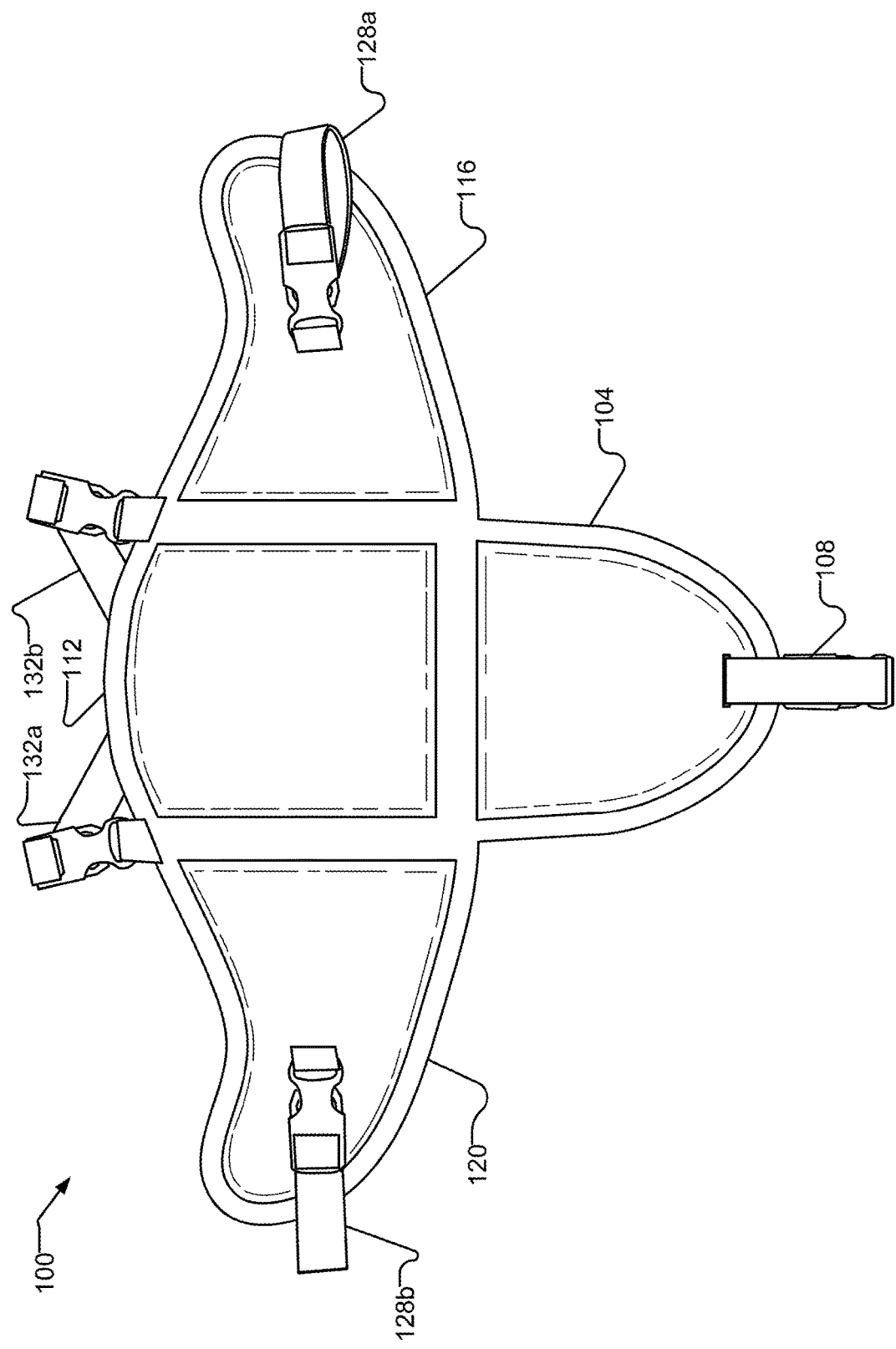
FIG. 3 shows an exterior the child seat of FIG. 1 with a lap strap uncoupled.

Turning to the figures, in an exemplary embodiment a child support 100 is designed to be attached to a wheeled suitcase 10 with an occupant such as a small child seated on a top side 11 of suitcase 10 and secured in and supported by support 100. As shown in FIGS. 1-3, support 100 includes a seat portion 104 with a bottom strap 108, a rear member 112, a right side portion 116, and a left side portion 120. Preferably, seat portion 104, right side portion 116, and left side portion 120 are attached to rear member 112. A lap strap 124 releasably connects left side portion 120 and right side portion 116 across a front of rear member 112 to assist in securing the occupant in support 100 on suitcase 10. A pair of side portion straps 128, right side portion strap 128a and left side portion strap 128b, are attached to a respective one of right side portion 116 and left side portion 120 and connect to one or more shafts of an extendable handle 14 of suitcase 10 as described in more detail below. A pair of shoulder straps 132 (e.g., 132a, 132b) attach to rear member 112 and are positioned over the shoulders of the occupant before being releasably connected to right side portion 116 and/or left side portion 120.

Figure 4:
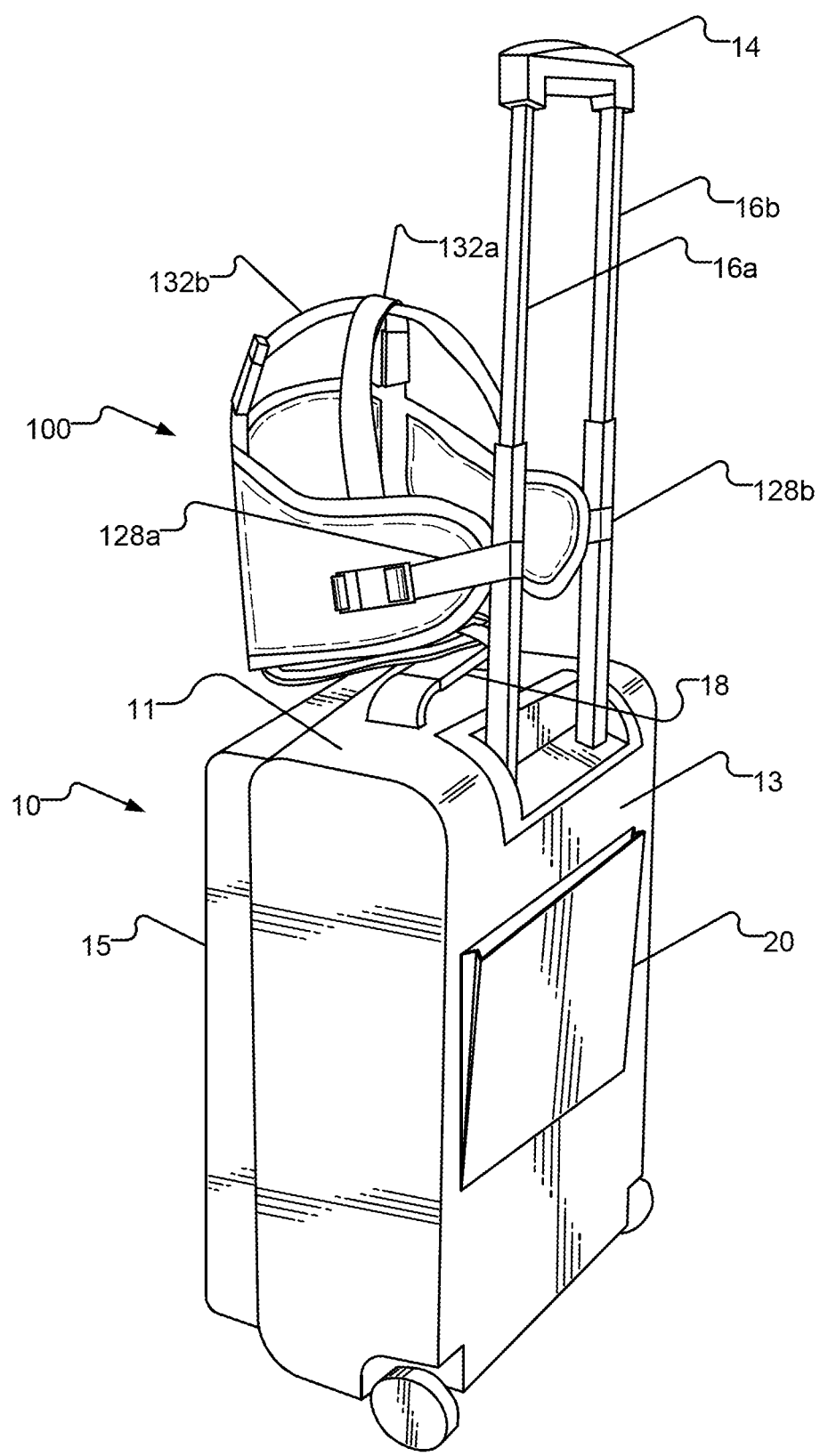
FIG. 4 depicts the child seat of FIG. 1 attached to a piece of luggage.

Child support 100 is designed and configured to be removably attached to wheeled suitcase 10, as shown in FIG. 4, with a first side 13 and a second side 15. Suitcase 10 may be any commercially available wheeled suitcase or similar that typically includes an extendable handle 14 on one side (first side 13 in the figures) of top 11, a top handle 18 (which is usually not extendable) on top 11, and may optionally include a pocket 20. Extendable handle 14 is attached to one or more extendable shafts 16 (e.g., right shaft 16a, left shaft 16b) that allow handle 14 to move from a collapsed position near top 11 to an extended position.

Child support 100 is attached to suitcase 10 with handle 14 extended by placing seat portion 104 on top 11 with rear member 112 positioned near the second side 15 of top 11 such that right side portion 116 and left side portion 120 extend toward first side 13 and shafts 16. Seat portion 104 is secured to suitcase 10 by attaching bottom strap 108 to top handle 18. In a preferred embodiment, right side portion 116 is secured to right shaft 16a via right side portion strap 128a and left side portion 120 is secured to left shaft 16b via left side portion strap 128b.

At this point, preferably, an intended occupant is placed on seat portion 104 on top 11 of suitcase 10 so that the occupant faces extendable shafts 16 (i.e., toward first side 13 on top 11 of suitcase 10). Lap strap 124 may be connected via any suitable mechanism such as a clip buckle, forming a securement around the waist of the occupant. In addition, shoulder straps 132 may be secured to rear member 112 after running from left side portion 120 or right side portion 116, and/or lap strap 124, using clips, buckle clips, ties, or any other suitable mechanism, which may be located at or near rear member 112, side portions 116, 120, or lap strap 124, or anywhere in between. In a preferred embodiment, shoulder straps 132 will cross each other to better secure the occupant in support 100 on suitcase 10.

Once an occupant is secured in child support 100 on suitcase 10, suitcase 10 can be wheeled about in the usually manner or stood upright in place (when standing in line) or wheeled back and forth or in circles (when standing in line, etc.). Optionally, a leash or wrist strap 130 may be attached to handle 14 and placed on a user's wrist as a safety precaution.

Figure 5:
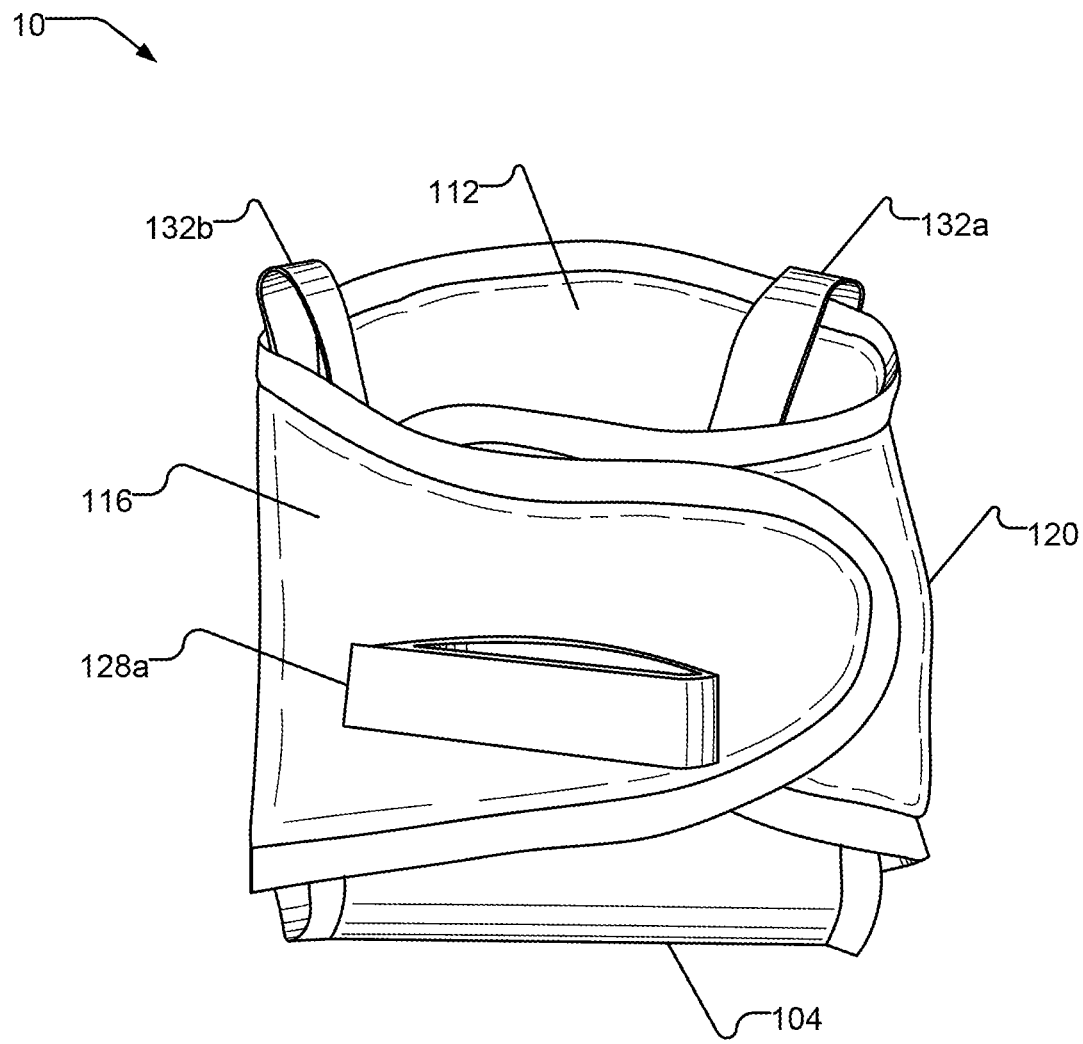
FIG. 5 depicts the child seat of FIG. 1 folded together.

When child support 100 is not required, lap strap 124 and shoulder straps 132 are disconnected and the occupant is removed from seat 104. Then, right side portion strap 128a is disconnected from shaft 16a and left side portion strap 128b is disconnected from 128b, and bottom strap 108 is disconnected from non-extendable top handle 18. Once removed from suitcase 10, child support 100 is light and flexible enough to be conveniently stowed, such as in pocket 20. Preferably, seat portion 104, left side portion 120, and right side portion 116 can be folded onto rear member 112 such that seat portion 104, left side portion 120, and right side portion 116 fit substantially within the profile of rear member 112, as shown in FIG. 5.

Straps and portions of the child support may be of any suitable materials, such as nylon, and the seat portion may include any suitable padding material, such as foam or stuffing. The attachment mechanisms may be of any suitable type.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method for supporting a child on a piece of luggage, comprising the steps of:
    removing a child support seat from a pocket of the piece of luggage, the child support seat including a rear member, a first side member attached to the rear member, the first side member having a first side member strap, a second side member attached to the rear member opposite the first side member, the second side member having a second side member strap, a bottom member attached to the rear member and including a bottom member strap, a lap strap, and a plurality of shoulder straps;
    attaching the child support seat to the luggage by securing the first side member strap to a shaft of an extendable handle of the luggage, securing the second side member strap to the shaft, and securing the bottom member strap to the luggage;
    placing an occupant in the child support seat;
    securing the lap strap around the occupant;
    securing the plurality of shoulder straps over the occupant;
    detaching the child support seat from the luggage; and
    placing the child support seat in the pocket,
    wherein the step of securing the bottom member strap to the luggage includes securing the bottom member strap to a handle of the luggage.

\* \* \* \* \*